(12) United States Patent  (10) Patent No.: US 9,272,372 B2
Gaudreault  (45) Date of Patent: Mar. 1, 2016

(54) WELDING SPINNERS, AND RELATED METHODS AND DEVICES

(71) Applicant: 1202858 Alberta Ltd., Bonnyville (CA)

(72) Inventor: Trevor Darren Gaudreault, Bonnyville (CA)

(73) Assignee: 1202858 Alberta Ltd., Bonnyville (CA)

( * ) Notice: Subject to any disclaimer, the term of this patent is extended or adjusted under 35 U.S.C. 154(b) by 99 days.

(21) Appl. No.: 14/080,740

(22) Filed: Nov. 14, 2013

(65) Prior Publication Data

US 2015/0129643 A1  May 14, 2015

(51) Int. Cl.
*B23K 20/12* (2006.01)
*B23K 37/00* (2006.01)
*B23K 37/053* (2006.01)

(52) U.S. Cl.
CPC ....... *B23K 37/0538* (2013.01); *Y10T 29/49716* (2015.01); *Y10T 29/49998* (2015.01)

(58) Field of Classification Search
None
See application file for complete search history.

(56) References Cited

U.S. PATENT DOCUMENTS

| | | | |
|---|---|---|---|
| 2,224,958 A | 12/1940 | Faber | |
| 2,225,273 A | 12/1940 | Jacobs | |
| 2,393,161 A | 3/1946 | Cullen | |
| 2,445,016 A | 7/1948 | Bentley | |
| 2,483,811 A | 10/1949 | Cullen | |
| 2,495,438 A | 1/1950 | Bentley et al. | |
| 2,567,303 A | 9/1951 | Statkus | |
| 2,763,053 A | 9/1956 | Anderson | |
| 2,768,281 A | 10/1956 | McDaniel | |
| 2,884,242 A | 4/1959 | Fleming | |
| 3,239,209 A * | 3/1966 | Kucka | 269/55 |
| 3,913,820 A | 10/1975 | Valentine | |
| 3,963,231 A | 6/1976 | Cooper | |
| 3,978,310 A * | 8/1976 | Gleason | 219/125.11 |
| 4,058,025 A | 11/1977 | Wood | |
| 4,541,621 A | 9/1985 | Amos | |
| 4,570,842 A | 2/1986 | Gergorious et al. | |
| 4,577,089 A * | 3/1986 | Olson et al. | 219/124.22 |
| 4,660,753 A | 4/1987 | Kushibe et al. | |
| 4,767,109 A | 8/1988 | Raketich | |
| 4,832,322 A * | 5/1989 | Christenson | 269/21 |
| 4,892,990 A * | 1/1990 | Acheson | 219/76.14 |
| 5,075,527 A * | 12/1991 | Ikuma | 219/59.1 |
| 5,265,789 A | 11/1993 | Adams | |
| 5,312,096 A | 5/1994 | Jasper | |
| 5,802,698 A * | 9/1998 | Fitzgerald et al. | 29/559 |
| 6,305,678 B1 | 10/2001 | Hammersmith et al. | |
| 6,622,906 B1 | 9/2003 | Kushibe | |
| 7,172,105 B2 | 2/2007 | Maes | |
| 7,942,307 B2 * | 5/2011 | Greenwall | 228/17.7 |
| 8,033,002 B2 * | 10/2011 | Lin et al. | 29/434 |
| 8,127,415 B2 * | 3/2012 | Kipping et al. | 29/38 R |
| 8,376,339 B2 | 2/2013 | Nagai et al. | |
| 8,777,085 B2 * | 7/2014 | Mercier | 228/11 |

FOREIGN PATENT DOCUMENTS

WO  2005097399  10/2005

* cited by examiner

*Primary Examiner* — Kiley Stoner
(74) *Attorney, Agent, or Firm* — Buchanan Nipper LLC

(57) ABSTRACT

A welding spinner has a base; a wheel with a mounting face for an implement to be welded; and a cam arm laterally connecting the wheel to the base and mounted to rotate between the base and the wheel to adjust the height of the wheel relative to the base. A method of using the welding spinner includes rotating the cam arm relative to the base to adjust the height of the wheel relative to the base. A counterweight device and a removable chuck are disclosed and may be used with a welding spinner.

12 Claims, 7 Drawing Sheets

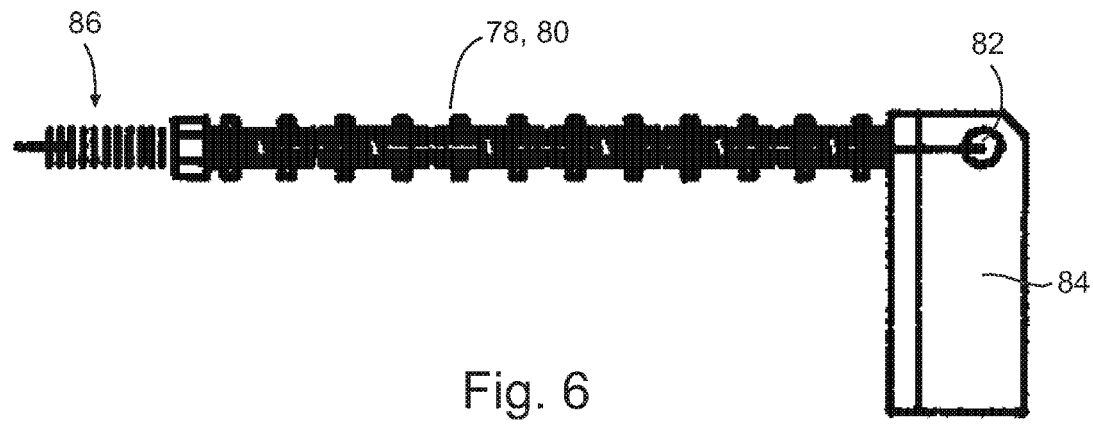
Fig. 6
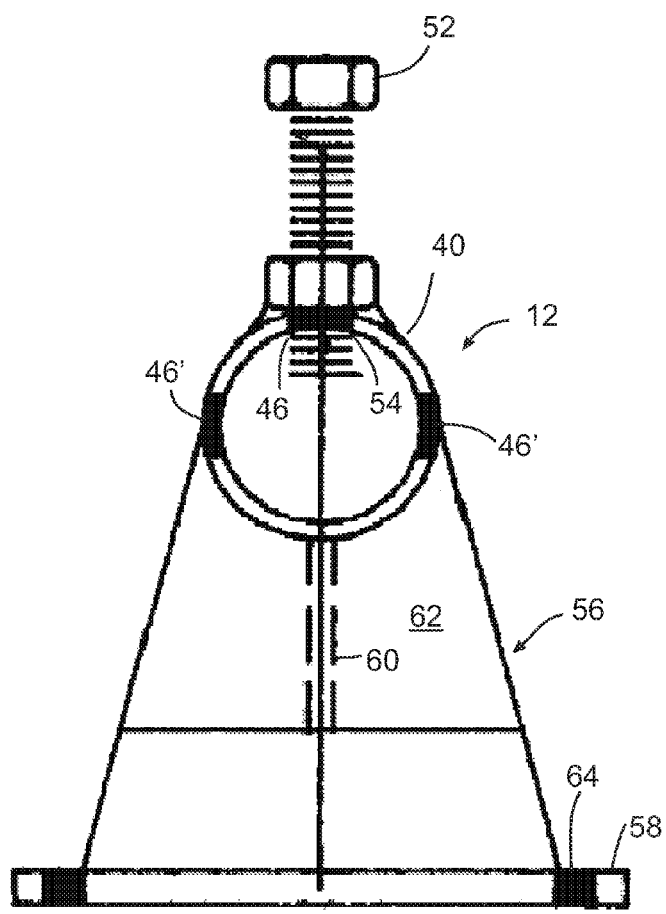
Fig. 7
Fig. 8
Fig. 5

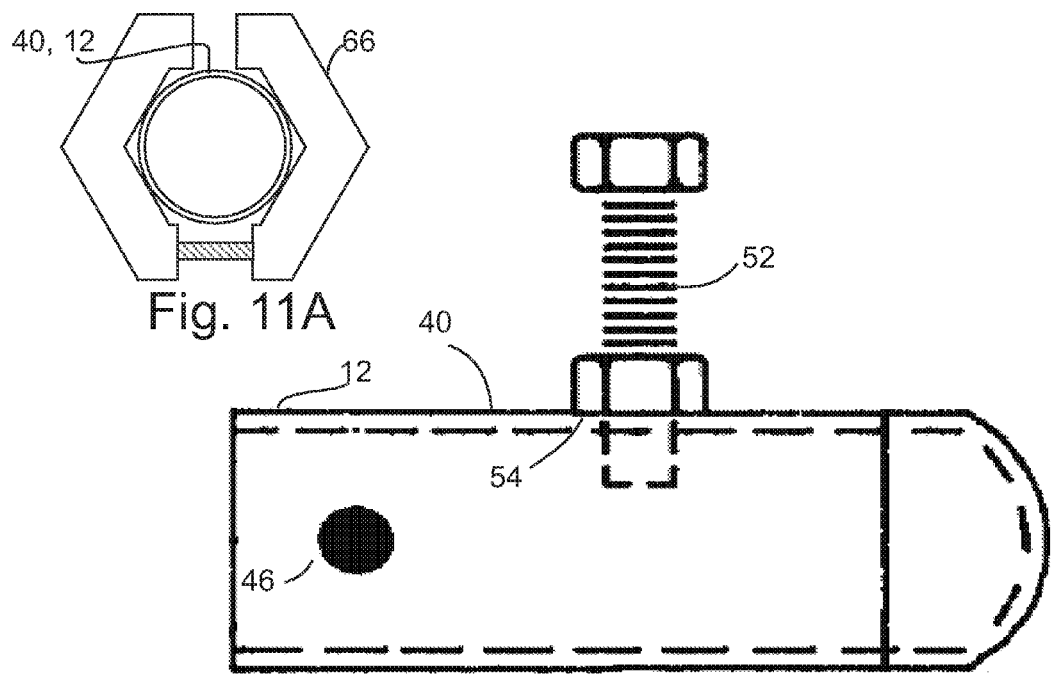
Fig. 11A
Fig. 11
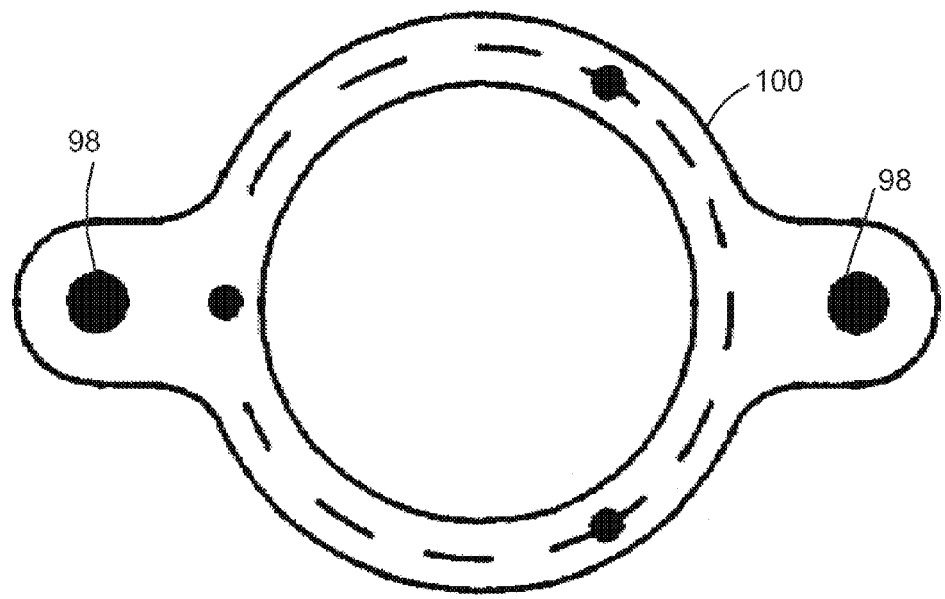
Fig. 12

WELDING SPINNERS, AND RELATED METHODS AND DEVICES

TECHNICAL FIELD

This document relates to welding spinners, and related methods and devices.

BACKGROUND

Welding spinners are used to spin an implement during welding. Welding spinners permit the implement, such as a pipe spool, to be moved while the torch itself may remain stationary while completing the weld.

SUMMARY

A welding spinner is disclosed comprising: a base; a wheel with a mounting face for an implement to be welded; and a cam arm laterally connecting the wheel to the base and mounted to rotate between the base and the wheel to adjust the height of the wheel relative to the base. A method of using the welding spinner is disclosed comprising rotating the cam arm relative to the base to adjust the height of the wheel relative to the base.

A welding spinner is disclosed comprising: a base; a wheel with an axle and a mounting face for an implement to be welded, in which the axle is mounted for rotation to the base; a belt brake secured to the base and wrapped at least partially around the axle; and a tensioner connected to the belt brake for adjusting the tension of the belt brake about the axle.

A combination is disclosed comprising: a welding spinner having a wheel with a mounting face; and a chuck detachably secured to the mounting face. A method is also disclosed comprising connecting to the chuck an implement to be welded.

A counterweight device is disclosed for a welding spinner having a wheel with an axle mounted for rotation to a base, the counterweight device comprising: a shaft; and an axle clamp at or near an end of the shaft. A method is also disclosed of retrofitting a welding spinner with the counterweight device by connecting the axle clamp to the axle.

In various embodiments, there may be included any one or more of the following features: One or more fasteners are provided for securing the cam arm to the base against rotation. The base comprises a sleeve receiving a shaft of the cam arm. The shaft has a plurality of apertures spaced radially at least partially about a circumference of the shaft for selective alignment with one or more apertures in the sleeve to receive the one or more fasteners. The one or more fasteners comprise a set screw mounted in the base for contacting a shaft of the cam arm. The base comprises a vise for gripping the sleeve. The cam arm is mounted to rotate about a first axis relative to the base; the wheel is mounted to rotate about a second axis relative to the cam arm; and the first axis and the second axis are parallel and offset to one another. The first axis and the second axis are adapted to be oriented horizontally in use. The belt brake comprises a chain. The chuck is detachably secured to the mounting face using one or more fasteners. The axle clamp comprises clamp jaws adapted to pivot relative to one another to grip the axle in use; and the shaft further comprises weight mount spaced from the axle clamp. Connecting to the mounting face an implement to be welded; and balancing the center of gravity of the combination of the welding spinner, the pipe, and the counterweight device such that the center of gravity falls along an axis of rotation defined by the axle. Methods of using the devices disclosed here.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 5 is a section view taken along the section lines 5-5 from FIG. 1.

FIG. 6 is a side elevation view of the chain brake bracket and chain separated from the welding spinner of FIG. 4.

FIGS. 7 and 8 are section views taken along the section lines 7-7 and 8-8, respectively, from FIG. 1.

FIG. 11 is a side elevation view, partially in section, of a sleeve embodiment of a base for the welding spinner of FIG. 1.

FIG. 11A is a side elevation view of a vice gripping the base of FIG. 11.

FIG. 12 is a section view of a chuck mounting plate taken along the section lines 12-12 from FIG. 1.

DETAILED DESCRIPTION

Immaterial modifications may be made to the embodiments described here without departing from what is covered by the claims.

Pipe welding fixtures or mounts may be used to secure a length of pipe so that the pipe may be manipulated during welding. It is sometimes desirable for a welder to have the capability to apply a weld so that the welder's torch is placed on top of the joint to be welded, and then to rotate the workpiece around the position of the torch. If a welder is required to physically move the torch around the curved surface of the pipe, this may increase the difficulty for the welder to produce a consistent bead. Additionally, requiring the torch to be moved may also increase the time in which it takes to produce the weld, and may raise safety concerns when a welder's helper or apprentice must hold the section of pipe being welded.

One common device used to rotate a workpiece during welding is a welding spinner. A welding spinner secures the workpiece, and enables the welder to rotate the workpiece by use of a wheel or handle that spins the workpiece about an axis of rotation. In some cases a welder may join various sections of pipe wherein one section has an offset created by a 90 or other degree bend in the section of pipe. Since such a pipe section is not centered about the axis of rotation, the spinner tool may be difficult to manipulate because the section of pipe is imbalanced.

Figure 1:
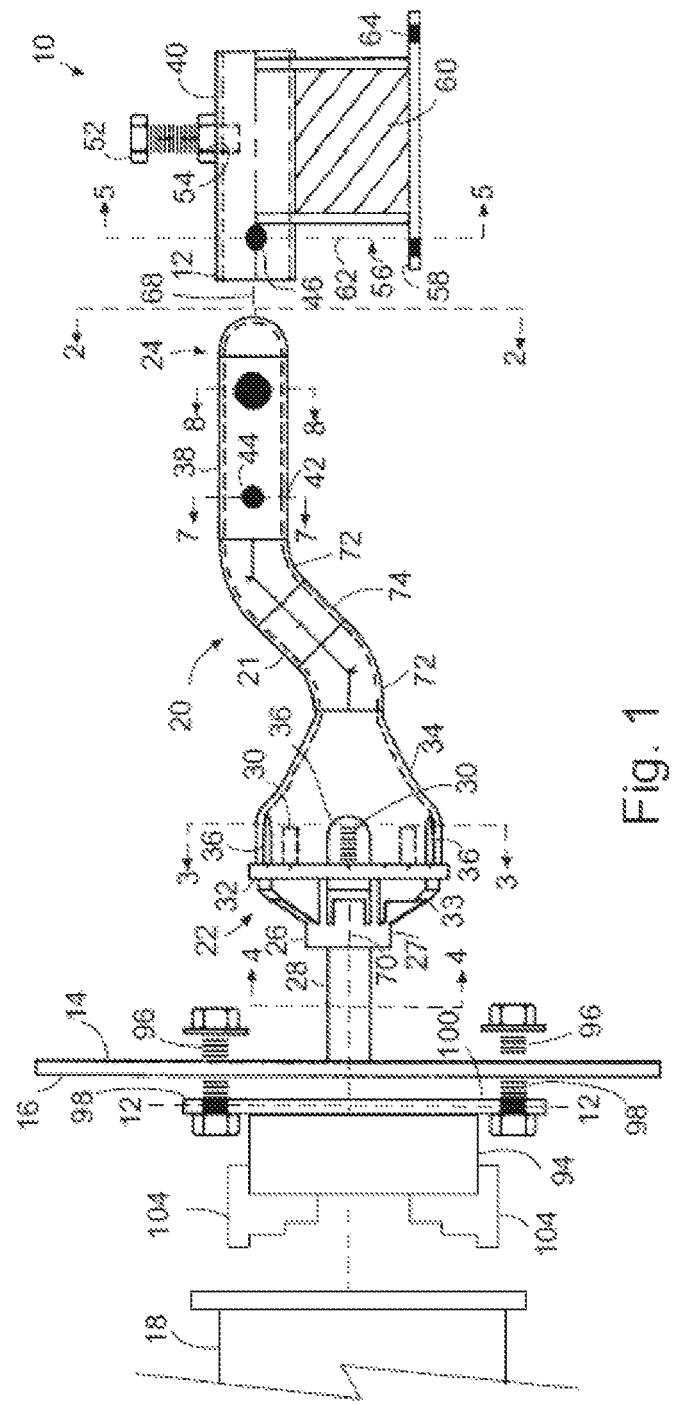
FIG. 1 is a side elevation partially expanded view of a welding spinner with a pipe spool.

Referring to FIG. 1, a welding spinner 10 is disclosed having a base 12 and a wheel 14. Wheel 14 has a mounting face 16 for an implement such as a pipe spool 18 to be welded. A cam arm 20 may laterally connect the wheel 14 to the base 12. Cam arm 20 is mounted to rotate between the base 12 and the wheel 14 to adjust the height of the wheel 14 relative to the base 12. Cam arm 20 is illustrated as comprising a bent arm 21 extended between a wheel mounting end portion 22 and a base mounting end portion 24.

Figure 3:
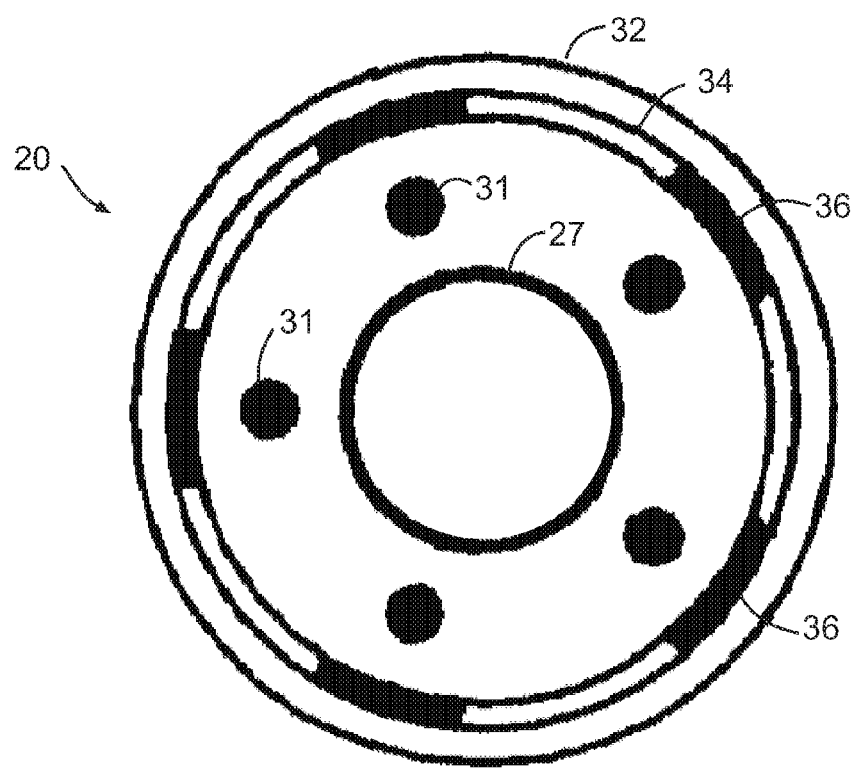
FIG. 3 is a section view taken along the section lines 3-3 from FIG. 1.
Figure 4:
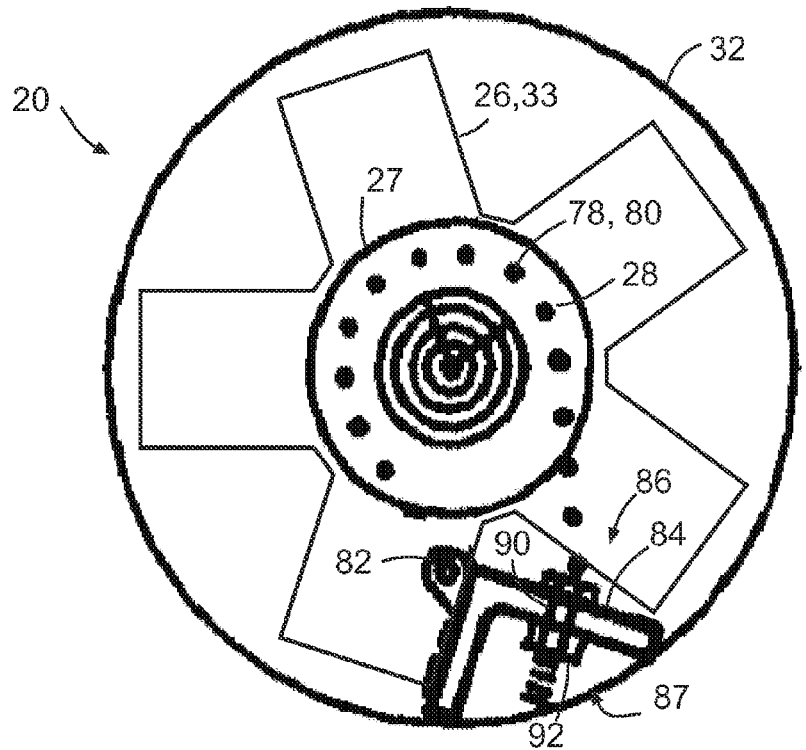
FIG. 4 is a section view taken along the section lines 4-4 from FIG. 1 and with a chain brake added.

Referring to FIGS. 1, 3 and 4, wheel end 22 of cam arm 20 may comprise a hub 26 with a bearing assembly 27 for mounting an axle shaft 28 of wheel 14. Hub 26 may be a wheel hub for a trailer, for example a utility trailer. Hub 26 may extend into a spindle 33 for connecting, for example by lug nuts 30 through lug holes 31, to hub mounting plate 32 of cam arm 20. Hub plate 32 may connect to bent arm 21 through a concentric reducer sleeve 34, which may have lateral windows 36 for accessing lugs 30.

Figure 9:
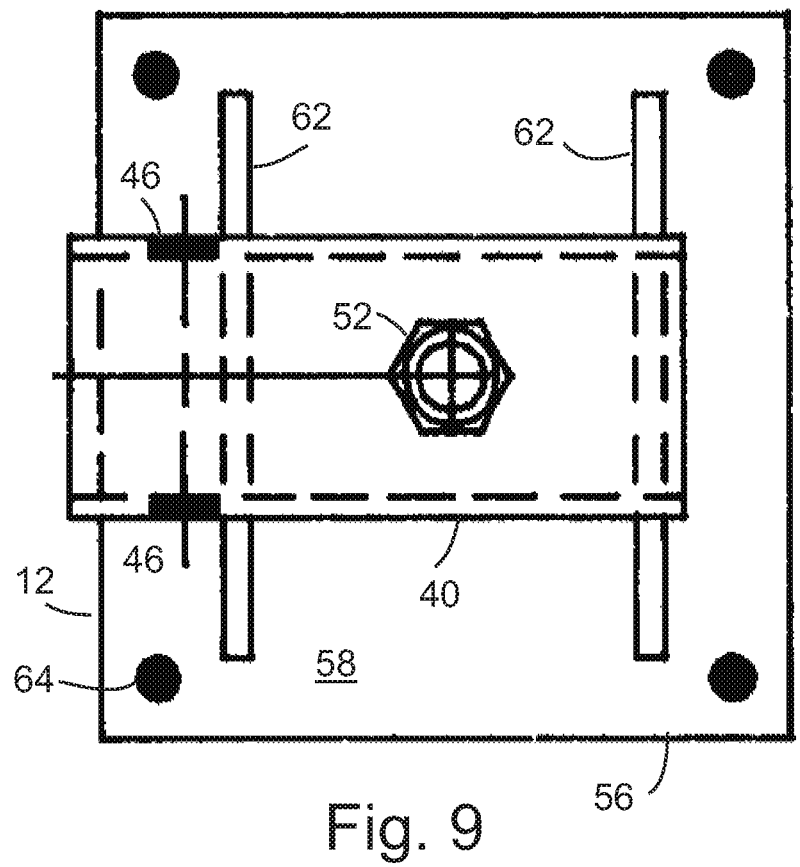
FIG. 9 is a top plan view, partially in section, of the base from the welding spinner of FIG. 1.
Figure 10:
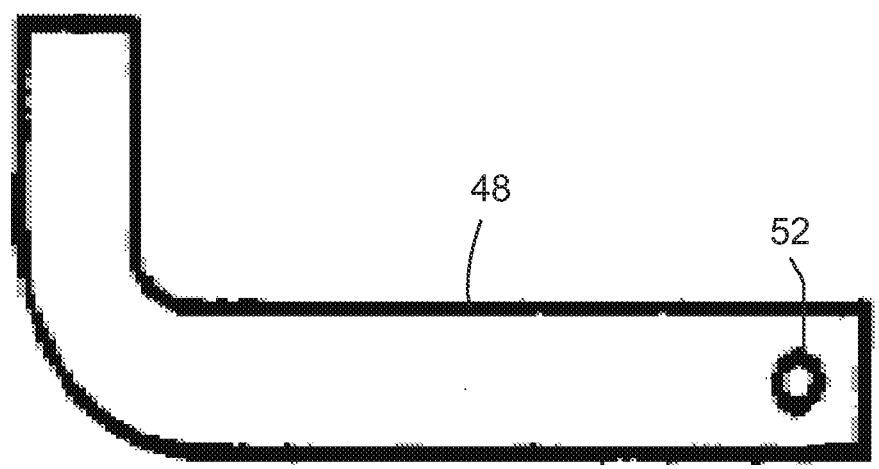
FIG. 10 is a side elevation view of a pivot pin for use with the welding spinner of FIG. 1.

Referring to FIGS. 1, 5, and 7-10, base mounting end portion 24 of cam arm 20 may comprise a shaft 38 receivable by a sleeve 40 of base 12. The shaft 38 may have a plurality of apertures 42 spaced radially at least partially about a circumference 44 of the shaft 38 (FIGS. 1 and 7). Apertures 42 are provided for selective alignment with one or more apertures 46 in the sleeve 40 (FIG. 1, 5, 7, 9). One or more fasteners, such as a pivot pin 48 (FIG. 10) may be provided for securing the cam arm 20 to the base 12 against rotation. In one case at least one pair of apertures 42 and 46 align to receive the pivot pin 48. In the example shown pivot pin 48 slides through one side and out the opposite side of sleeve 40 through two pairs of aligned apertures 42' and 46' (FIGS. 5, 7, 10). Pivot pin 48 may have an eyelet 50 at one end for receiving a cotter pin or other device to lock the pin 48, and hence the cam arm 20, in place (FIG. 10).

Referring to FIGS. 1, 5, and 9 the one or more fasteners may include a set screw such as a bolt 52 mounted in the base 12, for example in a threaded aperture 54. Bolt 52 may be advanced to contact an internal or external surface of shaft 38 when shaft 38 is in sleeve 40, for fine adjustment of the pivot angle of shaft 38 in sleeve 40. In some cases bolt 52 is vertically mounted as shown to permit the shaft 38 to be leveled by advancing the bolt 52 to contact shaft 38. Sleeve 40 may be sized with dimensions sufficient to permit shaft 38 to have some play within sleeve 40 to allow for leveling adjustments.

Referring to FIGS. 1, 5, and 9 an embodiment of a base 12 is shown where the base 12 is adapted to be connected to an external surface (not shown) such as a truck bed or a table. Thus, sleeve 40 forms part of a structural frame 56 that may include a base plate 58, a stiffener plate 60 extended between the sleeve 40 and base plate 58, and one or more support plates 62 extended between sleeve 40 and base plate 58 at angles relative to the stiffener plate 60. Bolt holes 64 or other connection devices may be provided in base plate 58 for connection to the external surface.

Referring to FIGS. 11 and 11A another embodiment of a base 12 is shown where the base 12 includes the combination of sleeve 40 and a vise 66 for selectively gripping the sleeve 40 in use. Such an embodiment permits sleeve 40 to be retrofitted to a suitable vise that is already located at a work site.

Referring to FIG. 1, shaft 38 may define a first axis of rotation 68 about which cam arm 20 is mounted to rotate about base 12. As well shaft 28 of wheel 14 may define a second axis of rotation 70 about which the wheel 12 is mounted to rotate about the cam arm 20. The first and second axes 68 and 70 may be parallel and offset to one another as shown. One way to achieve such a configuration is to form bent arm 21 by connected two forty five degree elbow pipe fittings 72 with and a straight pipe fitting 74 as shown. The first and second axes 68 and 70 may also be adapted to be oriented horizontally in use, as shown, such that rotation of cam arm 20 results in vertical height adjustments of wheel 12 while maintaining wheel 12 in a vertical plane.

Figure 2:
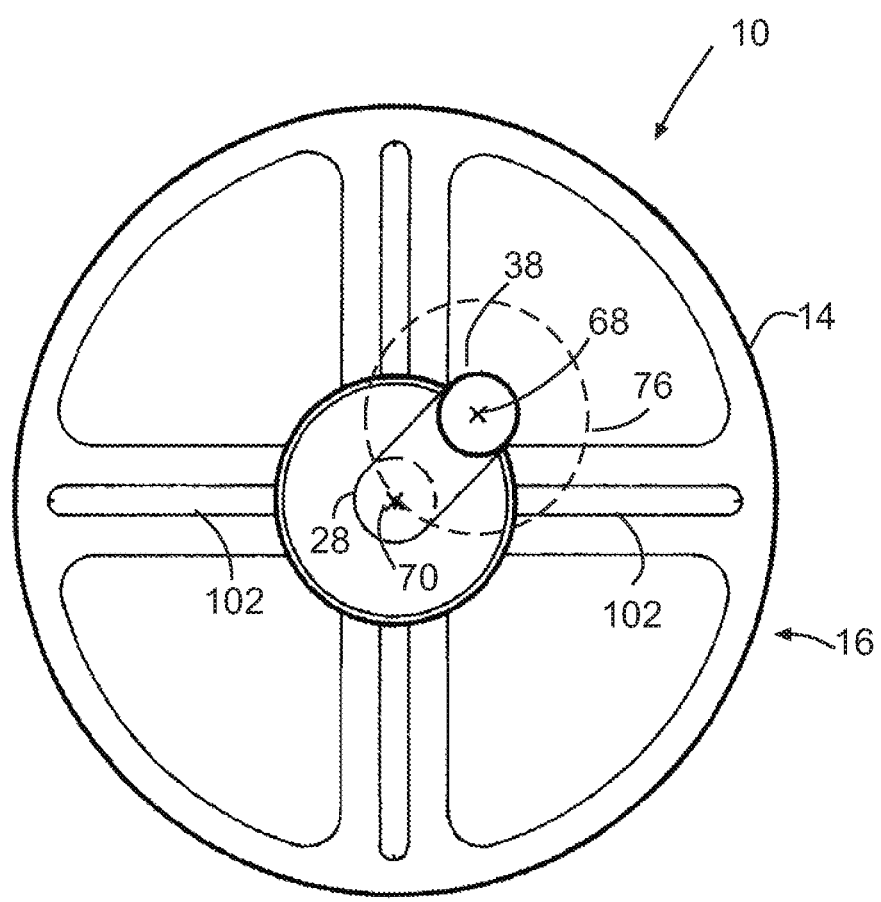
FIG. 2 is a rear end elevation view taken along the view lines 2-2 from FIG. 1.

Height adjustment of the wheel 14 may be understood with reference to FIGS. 1 and 2. As cam arm 20 is rotated about axis 68, wheel 14 travels around a path 76 defined around axis 68 (FIG. 2). The end result is that with each amount of rotation about axis 68, the height of wheel 14 is adjusted.

Referring to FIGS. 4 and 6, the welding spinner 10 may comprise a belt brake 78. Brake 78 may comprise a chain 80. Brake 78 may be secured to the base 12 and wrapped at least partially around the wheel axle 28. Belt brake 78 may have a first end 82 connected to a bracket 84, which for example extends laterally from the hub mounting plate 32. A second end 86 of belt brake 78 may also connect to bracket 84 after wrapping one or more times around axle 28. A tensioner 87 may be connected to the belt brake 78 for adjusting the tension of the belt brake 78 about the axle 28 (FIG. 4). Second end 86 of chain 80 may comprise a fastener such as a bolt 88 that passes through an aperture 90 in bracket 84. The tensioner 87 in the latter embodiment may comprise a nut 92 or threading (not shown) in aperture 90. When the nut 92 is tightened, the brake 78 is tightened and friction against rotation of axle 28 is increased. At above a certain tension level rotation of axle 28 may not be possible, and a full lock will be achieved. Below such a tension level tension may be adjusted to provide rotational resistance but not a full rotational lock upon axle 28. Such partial lock tension may be used to permit the wheel 14 to be rotated in a controlled fashion.

Referring to FIGS. 1, 2, and 12, a welding spinner 10 may be combined with a chuck 94. The chuck 94 may be detachably secured to the mounting face 16 of wheel 14, for example using one or more fasteners such as bolts 96 (FIG. 1). Bolts 96 may pass through apertures 98 in a chuck attachment plate 100 connected to the chuck 94 (FIGS. 1 and 12). Bolts 96 may also pass through positioning slots 102 that are aligned in use with apertures 98 and that are present in the mounting face 16 of wheel 14 (FIG. 2). Thus, chuck 94 may be retrofitted to an existing wheel 14 and easily removed once work is complete or if no longer needed. Two or more for example three jaws 104 may be provided on chuck 94 for mounting an implement such as pipe spool 18 to be welded (FIG. 1). Chuck 94 may be a lathe chuck.

Figure 13:
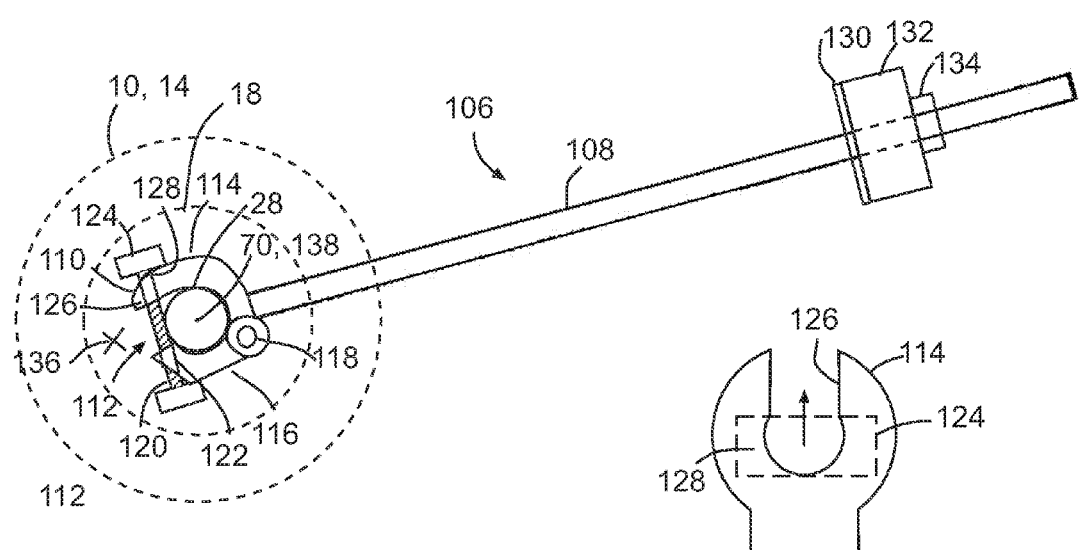
FIG. 13 is a side elevation view, partially in section, of a counterweight device connected to the spindle of the welding spinner of FIG. 1.
Figure 13A:
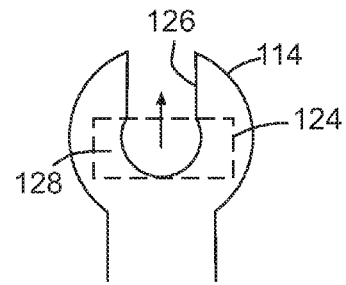
FIG. 13A is a top plan view of one of the jaws of the axle clamp of the device of FIG. 13.

Referring to FIGS. 13 and 13A, a counterweight device 106 is shown for use with welding spinner 10. Device 106 comprises a shaft 108 and an axle clamp 110 at or near an end 112 of shaft 108 (FIG. 13). The axle clamp 110 may comprises clamp jaws 114 and 116 adapted to pivot relative to one another, for example about pivot axis 118, to grip the axle 28 in use. One or more fasteners such as a bolt 120 may be connected to the shaft 108 to secure the counterweight device 106 in place. For example, bolt 120 may be mounted in an aperture 122 in jaw 116, and may have a nut or flanged end 124 that is received and locked in a slot 126 or aperture in jaw 114 so that the axle 28 is locked between the shaft 108 and the bolt 120 in use. Use of a slot 126 allows bolt 120 to be laterally removed from slot 126 on loosening to open the jaws and release the axle 28 (FIGS. 13 and 13A). A seat 128 may be provided in jaw 114 to lock end 124 in place on tightening bolt 120. The device 106 may be retrofitted to an existing welding spinner 10 by connecting the axle clamp 110 to the axle 28.

Counterweight device 106 may comprise a weight mount such as a flange 130 spaced from the axle clamp 110. One or more weights 132 may be added to weight mount 130 and secured in place for example with a nut 134. The weight mount may be adjustable, for example reposition able along the length of shaft 108 to adjust the centre of gravity of the device 106. Once an implement such as a spool 18 is mounted to wheel 14, an initial centre of gravity 136 of the combination of the spinner 10, the device 106 and the spool 18 may be adjusted to a balanced centre of gravity 138 along the axis of rotation 70 of the wheel axle 28. Balancing the centre of gravity may be done by repositioning one or both the counterweight device 106 or spool 18 relative to one another, and by adding, repositioning, or removing weights 132 from device 106. Once balanced, welding may be commenced.

The examples disclosed are for example purposes only, and suitable variants may be used for various components. For example, instead of male-female connection between the cam arm 20 and sleeve 40, respectively, a female-male connection may be used, for example with shaft 38 provided as a sleeve and sleeve 40 provided as a shaft. Other connections that do not require a shaft and sleeve may be used. Similar variants may be used with wheel mounting end 22. When an item is mounted or connected to another item, the mounting or connection may be accomplished through intermediate parts, such as plates and washers. For example, belt brake 78 is connected to base 12 through cam arm 20 and sleeve 40. Connection between items may be through suitable fastening devices such as bolts, screws, welding and clamps, unless the context otherwise dictates. Wheel 14 may be powered by manual rotation or by a motor. Although pipe spool 18 is shown in the figures, other implements may be welded with spinner 10, including non pipe implements. A motor may be provided for motorized rotation of cam arm 20 and hence height adjustment of wheel 14.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A welding spinner comprising:
   a base;
   a welding spinner wheel with an axle and a mounting face for an implement to be welded; and
   a cam arm laterally connecting the wheel to the base, the cam arm being mounted to rotate about a first axis relative to the base, and the welding spinner wheel being mounted to rotate about a second axis relative to the cam arm, the second axis being defined by the axle, the first axis and the second axis being parallel to and offset from one another, in which rotation of the cam arm about the first axis adjusts the vertical height of the axle relative to the base within a plane of movement.

2. The welding spinner of claim 1 further comprising one or more fasteners for securing the cam arm to the base against rotation.

3. The welding spinner of claim 2 in which the base comprises a sleeve receiving a shaft of the cam arm.

4. The welding spinner of claim 3 in which the shaft has a plurality of apertures spaced radially at least partially about a circumference of the shaft for selective alignment with one or more apertures in the sleeve to receive the one or more fasteners.

5. The welding spinner of claim 3 in which the one or more fasteners comprise a set screw mounted in the base for contacting a shaft of the cam arm.

6. The welding spinner of claim 3 in which the base comprises a vise for gripping the sleeve.

7. The welding spinner of claim 1 in which the first axis and the second axis are adapted to be oriented horizontally in use.

8. A method of using the welding spinner of claim 1 comprising:
   rotating the cam arm relative to the base to adjust the vertical height of the axle to a selected height relative to the base; and
   spinning the welding spinner wheel about the axle at the selected height while welding an implement mounted on the mounting face.

9. The welding spinner of claim 1 comprising:
   a belt brake secured to the base and wrapped at least partially around the axle; and
   a tensioner connected to the belt brake for adjusting the tension of the belt brake about the axle.

10. The welding spinner of claim 9 in which the belt brake comprises a chain.

11. A welding spinner comprising:
    a base;
    a wheel with a mounting face for an implement to be welded;
    a cam arm laterally connecting the wheel to the base and mounted to rotate between the base and the wheel to adjust the height of the wheel relative to the base;
    one or more fasteners for securing the cam arm to the base against rotation; and
    in which the base comprises a sleeve receiving a shaft of the cam arm, and one or more of the shaft and sleeve has a plurality of apertures spaced radially at least partially about a circumference of the one or more of the shaft or sleeve for selective alignment with one or more apertures in the other of the shaft or sleeve to receive the one or more fasteners.

12. The welding spinner of claim 11 in which the one or more fasteners comprise a set screw mounted in the base for contacting a shaft of the cam arm.

* * * * *